Jan. 16, 1968   J. W. HOLLOWAY   3,363,912
SEAL GASKET
Filed May 7, 1965

INVENTOR
JOHN W. HOLLOWAY

BY *LeBlanc and Shur*

ATTORNEYS.

United States Patent Office 3,363,912
Patented Jan. 16, 1968

3,363,912
SEAL GASKET
John W. Holloway, 1860 NE. 53rd St.,
Fort Lauderdale, Fla. 33308
Filed May 7, 1965, Ser. No. 453,926
6 Claims. (Cl. 277—206)

ABSTRACT OF THE DISCLOSURE

The pipe joint comprises a first pipe having an enlarged hub and a second pipe having an end telescoped within the hub of the first pipe. A sealing gasket is positioned between the hub and the second pipe and comprises concentric cylindrical members integrally connected at one end and defining a space therebetween, the members communicating with fluid flowing in the pipes at their opposite ends. The hub has an outwardly directed interior annular recess receiving an annular protrusion formed on the outer concentric member. Axially spaced, annular ridges are formed on the inner and outer surfaces of the inner and outer members respectively to bear against the respective inner surfaces of the hub and the outer surfaces of the second pipe. An annular outwardly directed recess is formed in the inner face of the protrusion. The members expand away from one another and the protrusion expands when the space between the members is filled with fluid flowing through the pipes.

Background of the invention

This invention relates to an improved sealing gasket that provides an inexpensive yet effective means of connecting the ends of two pipes together, and to the improved pipe joint formed thereby. More particularly, this invention relates to a uniquely shaped sealing gasket which may be tightly positioned between the telescoped ends of two polyvinyl chloride pipes to form the sole means of connecting the ends of these pipes together. Additionally, this novel sealing gasket prevents leakage at the pipe joint thus formed, regardless of the pressure of the fluid flowing through the pipes, and in fact the sealing effectiveness of this gasket is increased as the pressure of the fluid increases.

In the past, it has been the standard practice in the industry to form a joint between the ends of two polyvinyl chloride pipes either by using a solvent cement or by forming mated threaded sections on the ends of the pipes. However, while the pipe joints formed by these standard methods are generally satisfactory for their intended use, the joints are usually the weakest portion of the piping system, and if the joint is defectively formed, the entire joint must be cut out and a completely new joint formed in its place. Also, construction of polyvinyl chloride pipe joints by these standard methods is a relatively time-consuming operation, especially if the joints are formed in the field, and this, together with the aforementioned disadvantages, adds tremendously to the over-all cost of a piping system. However, in spite of these disadvantages, the aforementioned methods of forming polyvinyl chloride pipe joints are still in common usage since there have heretofore been no commercially acceptable alternatives available.

Also, in the past, various types of sealing gaskets or rings have been utilized to prevent leakage in pipe joints. Moreover, sealing gaskets have also been used wherein the sealing effectiveness of the gasket increased as the pressure of the fluid flowing in the pipes increased. However, such sealing gaskets have been found to leak when the fluid in the pipes is under low or no pressure, and for this reason they have not come into common usage and are used primarily in portable irrigation pipes or the like where such leakage is not a problem and in fact is desirable to facilitate movement of the pipes.

Accordingly, it is a primary object of this invention to provide a novel, improved sealing gasket which when positioned between the telescoped ends of two pipes, affords an amazingly simple, yet extremely effective means of connecting the ends of the pipes together and for sealing the pipe joint thus formed, regardless of the pressure of the fluid flowing in the pipes. A related object of this invention is to provide an improved pipe joint, formed preferably between the ends of two polyvinyl chloride pipes, which is inexpensive to construct and maintain and which has increased reliability over present polyvinyl chloride pipe joints.

Another object of this invention is to provide a novel sealing gasket for use in a pipe joint which eliminates leakage at the joint regardless of whether the joint is utilized in a low-pressure drainage, waste or vent system, or in a high-pressure industrial system.

Another object of the present invention is to provide an improved high strength, easy-to-assemble pipe joint in which the ends of two, preferably polyvinyl chloride, pipes are telescoped together with the improved sealing gasket of this invention tightly positioned therebetween to securely and effectively seal and connect the ends of the pipes. A related object of the present invention is to provide an improved sealing gasket for use in a pipe joint characterized in that it includes a generally tubular body portion formed of two radially spaced, concentric cylindrical members joined together at one end and adapted to have the elongated, annular hollow space formed between the cylindrical members communicating with the fluid flowing in the pipes thereby permitting the sealing effectiveness of the gasket to increase as the pressure of the fluid flowing in the pipes increases. A further related object of this invention is to provide the tubular body portion of the improved sealing gasket with an integrally, radially inwardly directed rib member formed on the other, open end of the inner cylindrical member and arranged so that the rib member may be clamped between the pipes to increase the sealing effectiveness of the joint, particularly when the pressure of the fluid in the pipes is relatively low.

Still another object of this invention is to provide an improved pipe joint in which one of the overlapping ends of the pipes comprising the joints has an annular recess constructed therein that tightly receives an annular protrusion integrally formed on the improved sealing gasket of this invention. The outer surface of the annular protrusion is formed substantially congruent with the shape of the inner surface of the annular recess so that this protrusion-recess arrangement prevents longitudinal movement of the gasket and substantially aids in retaining the gasket correctly within the pipe joint. A related object is to provide the improved sealing gasket of this invention with a plurality of V-shaped ridges integrally formed on the body of the gasket which cause the gasket to be tightly compressed when it is positioned between the overlapping ends of the pipes comprising the joint and thereby increases the sealing effectiveness of the gasket.

Still other objects and advantages of the present invention will be apparent from the following description thereof, with reference to the accompanying drawings, in which.

Figure 1:
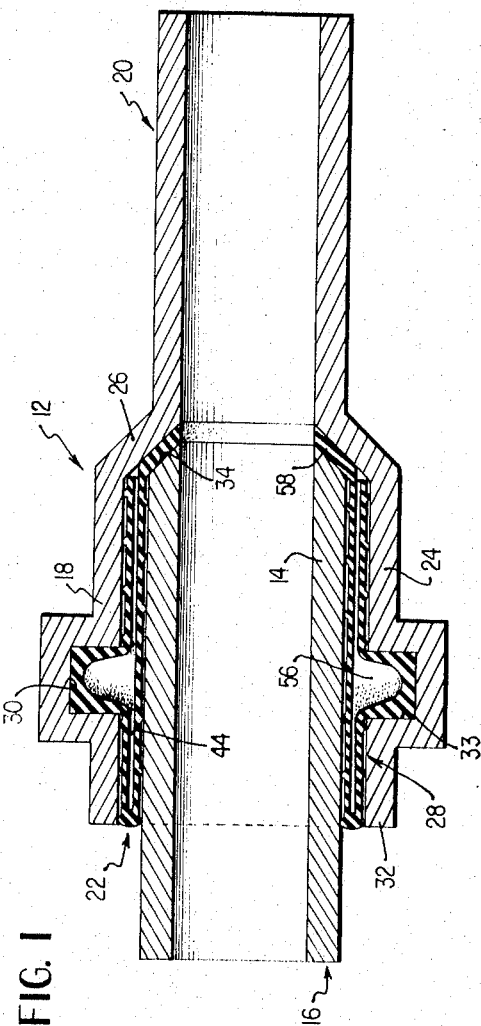
FIGURE 1 is a vertical cross-sectional view of the improved pipe joint of this invention showing the improved sealing gasket of this invention positioned between the telescoped ends of the pair of pipes forming the joint.

Referring now to the drawings and specifically to FIGURE 1, there is shown an improved pipe joint 12 of this invention. To form this joint 12, an end 14 of a pipe 16 is telescoped within an end 18 of a second pipe 20 with an improved sealing gasket 22 of this invention tightly positioned between the ends 14 and 18 of the pipes to provide the sole means of securing the pipes 16 and 20 together and also to seal the joint against leakage.

To accommodate the end 14 of the pipe 16, the pipe 20 has an enlarged hub 24 formed on an end 18 which is integrally attached to the remainder of the pipe 20 by a sloping, connecting portion 26. The inner diameter of the hub 24 is made so that the generally tubular body 28 of the sealing gasket 22 fits tightly between the inner diameter of the hub 24 and the outer diameter of the end 14 of the inner pipe 16 when the ends of the pipes are telescoped together to form the joint 12.

An annular, radially outwardly projecting recess 30 is formed in the hub 24 and, as shown in FIGURE 1, the recess 30 is slightly closer to the leading edge 32 of the hub than to the sloping portion 26. The radially inner surface 33 of the recess 30 has a generally rectangular, cross-sectional configuration. The enlarged hub 24, including the annular recess 30, may be formed by various methods, but preferably is formed by heating the end 18 of the pipe 20 and then enlarging and correctly shaping the end 18 by the use of a mandrel.

As shown in FIGURE 1, the end 14 of the pipe 16 is similar to the remainder of the pipe 16 in both diameter and general shape. The leading edge 34 of the end 14 is beveled outwardly at 36 so that the edge 34 and the sloping portion 26 have substantially the same angle, and thus when the pipe 16 is completely telescoped within the hub 24, the edge 34 may be positioned closely adjacent to the sloping portion 26 so that the flow path through the pipes is smooth and substantially uninterrupted.

Figure 3:
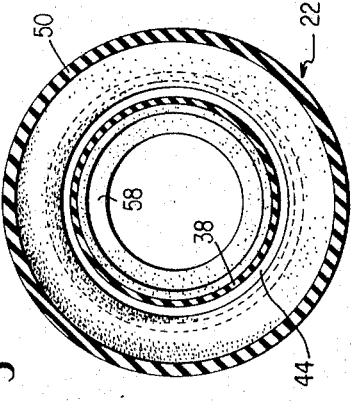
FIGURE 3 is a vertical cross-sectional view taken along lines 3—3 of FIGURE 2.
Figure 2:
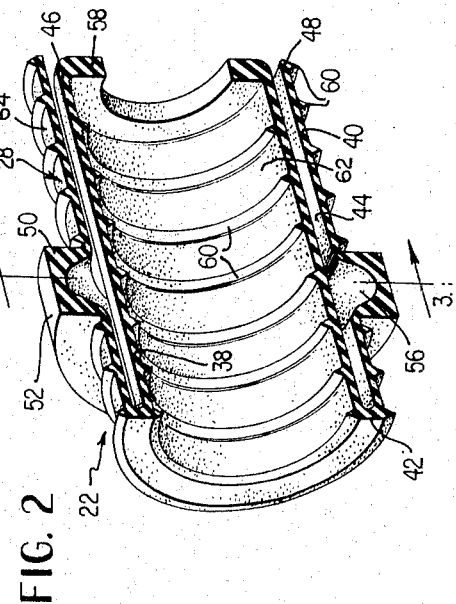
FIGURE 2 is a vertical cross-sectional view of the sealing gasket of this invention, taken along the longitudinal axis of the gasket.

Referring now to FIGURES 2 and 3, the improved sealing gasket 22 of this invention may be generally described as being tubular in shape and includes a pair of concentric, radially spaced, inner and outer cylindrical members 38 and 40, respectively. These members 38 and 40 are integrally connected together at one end by a generally U-shaped portion 42 which in addition to interconnecting the cylindrical members, also forces the members to remain spaced radially apart, as shown in FIGURE 2, when the gasket is not compressed between the hub 24 and the end 14 of the pipe 16. Thus, the tubular members 38 and 40 and the U-shaped portion 42 define an elongated, annular space 44 therebetween. The other ends 46 and 48 of the members 38 and 40, respectively, are spaced radially from each other and permit, when the joint 12 is assembled, the annular space 44 to communicate with the fluid flowing in the pipes via the narrow space between the sloping portion 26 and the leading edge 34 of the pipe 16.

As shown in FIGURE 1, the sealing gasket 22 is made so that the length thereof, in the direction parallel to the longitudinal axis of the pipes, is such that when the gasket is correctly positioned within the hub 24, the gasket extends from the sloping portion 26 to the leading edge 32 of the hub, e.g., extends substantially the entire length of the hub. The sealing gasket 22, as shown, is of one-piece construction and may be molded of neoprene or other like materials, which are resilient enough to permit insertion of the gasket within the hub 24.

The outer cylindrical member 40 has an annular, radially outwardly extending protrusion 50 integrally formed thereon which is constructed to fit snugly within the annular recess 30 formed in the hub 24. The radially outer surface 52 of the annular protrusion 50 is congruent to the radially inner surface 33 of the recess 30, i.e., has substantially the same shape and dimensions, and thus when the sealing gasket 22 is correctly positioned within the hub 24, a tight seal is afforded therebetween. In addition to increasing the sealing effectiveness of the sealing gasket, the protrusion 50 aids in preventing longitudinal movement of the gasket within the joint and also helps to secure the ends of the pipes 16 and 20 together.

Also, as best shown in FIGURE 2, the protrusion 50 has an annular hollow cavity 56 formed therein which communicates with the annular space 44 and thereby communicates with the high pressure fluid flowing through the pipes as explained above. Therefore, it will be apparent that as the pressure of the fluid flowing in the pipes becomes higher, the sealing effectiveness of the gasket increases since this higher pressure fluid causes the inner and outer cylindrical members 38 and 40 and the protrusion 50 to be pressed or urged into tighter sealing contact with the pipe 16 and the hub 24.

The sealing gasket also has a radially inwardly projecting rib 58 integrally formed on the end 46 of the cylindrical member 38 to provide added sealing effectiveness of the gasket, particularly when the pressure of the fluid flowing in the pipes is relatively low. As shown in FIGURE 2, the rib 58 normally extends radially inwardly a distance approximately equal to the wall thickness of the pipes; however, when the end 14 of the pipe 16 is being inserted in the hub 24, the rib 58 is forced to swing outwardly against the sloping portion 26 by the leading edge 34 of the pipe 16. Subsequently, when the joint 12 is completed, as shown in FIGURE 1, the rib 58 is firmly pinched or clamped between the leading edge 34 and the sloping portion 26, thereby providing an effective and completely satisfactory low-pressure seal between the pipes 16 and 20.

As best shown in FIGURE 2, the sealing gasket 22 also has a plurality of annular, generally V-shaped ridges 60 integrally formed on the radially inner and outer surfaces 62 and 64 of the cylindrical members 38 and 40, respectively. The annular ridges extend completely around the members at evenly spaced intervals along the entire longitudinal length of the members and are arranged to grip tightly the outer and inner surfaces of the end 14 of the pipe 16 and the hub 24, respectively.

As noted hereinabove, the enlarged hub 24 is carefully constructed so that the radial distance between the inner diameter of the hub 24 and the outer diameter of the end 14 of the pipe 16 is substantially equal to the thickness of the U-shaped end portion 42 that interconnects the cylindrical members 38 and 40. Thus, the addition of these V-shaped ridges 60 to the cylindrical members 38 and 40 causes the sealing gasket to be radially compressed when it is correctly positioned within the pipe joint 12. This compression, resulting from the incorporation of the ridges 60 onto the gasket, significantly increases the sealing effectiveness of the gasket and also aids in the sustention of the pipe joint 12. In view of the fact that the sealing gasket 22 is tightly compressed when positioned between the end 14 of the pipe 16 and the hub 24, lubrication may be required for the insertion of the end 14 of the pipe 16 in the hub 24.

The novel pipe joint 12 of this invention may be assembled by first placing the improved sealing gasket of this invention within the hub 24 so that the radially outwardly extending protrusion 50 fits within the annular recess 30 and the radially inwardly extending rib 58 is adjacent to the sloping portion 26. Thereafter, the end 14 of the pipe 16 is telescoped within the hub 24 until the leading edge 34 engages the rib 58. Further insertion of the end 14 within the hub causes the leading edge 34 of the end 14 to clamp the rib 58 between the leading edge 34 and the sloping portion 26 to prevent leakage therebetween.

In view of the foregoing, it should be apparent that the above-described pipe joint of this invention affords many significant advantages not found in the prior pipe joints. Furthermore, the amazingly simple yet extremely effective pipe joint of this invention permits the interconnection of two polyvinyl chloride pipes, in end-to-end relationship, without the necessity of using a solvent cement or of threading the mating ends of the pipes or of using any mechanical fasteners. Additionally, the improved sealing gasket of this invention permits the facile assembly and disassembly of this improved pipe joint, particularly in the field, without the utilization of special tools or the like.

Moreover, the improved sealing gasket of this invention not only securely connects the pipes together, but also effectively and satisfactorily seals the pipe joint. As noted above, the unique construction of the sealing gasket of this invention permits maximum sealing effectiveness regardless of the pressure of the fluid flowing in the pipes and in fact, the sealing effectiveness of the gasket increases as the pressure of the fluid becomes greater. In addition, this novel sealing gasket positively prevents relative longitudinal movement between the ends of the pipes forming the pipe joint.

Furthermore, to ensure satisfactory sealing characteristic, particularly when the pressure of the fluid flowing in the pipes is relatively low, the sealing gasket of this invention includes a novel rib which may be securely clamped between telescoped pipes and a plurality of V-shaped ridges which cause radial compression of the gasket within the pipe joint.

Therefore, in summary, the improved pipe joint and sealing gasket of this invention provides a relatively inexpensive, commercially acceptable alternative to the existing methods of connecting a pair of polyvinyl chloride pipes together that avoids the disadvantages found in the prior commercial pipe joints and sealing gaskets and thus solves a long-standing problem in the art.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An improved pipe joint comprising a first pipe having hub means formed on one end thereof; a second pipe having an end thereof telescoped within said hub means of first pipe; said hub means and said telescoped end of said second pipe defining an elongated, annular space therebetween; said hub means also defining an annular recess which communicates with said space; tubular sealing gasket means positioned tightly within said space and extending substantially the entire length of said space for sealing said joint and for connecting the ends of said pipes together, said sealing gasket means including two concentric, cylindrical members connected together at one end adjacent the open end of said hub means, said members defining a second elongated, annular space therebetween which communicates with fluid flowing under pressure in said pipes through the space between concentric opposite end portions thereof, the inner cylindrical member of said sealing gasket means having an integral rib means formed adjacent the associated opposite end portion thereof, said rib means being tightly clamped between said end of said second pipe and said hub means of said first pipe; and means for preventing longitudinal movement of said sealing gasket means within said space including an annular protrusion formed on said sealing gasket means and positioned within said annnular recess, said protrusion having a hollow annular portion formed therein which communicates with said second space.

2. A pipe joint according to claim 1 including a plurality of V-shaped ridges formed on the radially inner and outer surfaces of said cylindrical members for respective bearing engagement against the outer surface of said second pipe and the inner surface of said hub means.

3. A pipe joint according to claim 1 wherein said opposite end portions of said cylindrical members are concentrically spaced one from the other to define an annular space therebetween for communication with the fluid in said pipes.

4. A pipe joint according to claim 1 wherein said cylindrical members are integrally connected at said one end to define a generally U-shaped gasket end portion.

5. A pipe joint according to claim 4 wherein the spacing between the outer diameter of said second pipe end and the inner diameter of said hub means is substantially equal to the thickness of said U-shaped gasket end portion.

6. A pipe joint according to claim 1 wherein said hub means comprises an annular base portion, said rib means extending radially inwardly and overlying the end of said second pipe to engage against said annular base portion.

References Cited

UNITED STATES PATENTS

| 2,651,741 | 10/1952 | Nathan. |
| 2,815,966 | 12/1957 | House _____ 285—97 |
| 3,222,076 | 12/1965 | Hollingsworth _____ 285—97 X |
| 3,258,271 | 6/1966 | Hollingsworth ____ 277—34.3 X |

FOREIGN PATENTS

| 277,042 | 4/1963 | Austria. |
| 1,269,188 | 7/1961 | France. |
| 1,361,209 | 4/1964 | France. |
| 1,036,023 | 8/1958 | Germany. |

LAVERNE D. GEIGER, *Primary Examiner.*

J. S. MEDNICK, *Assistant Examiner.*